(12) United States Patent
Okabe

(10) Patent No.: US 11,775,231 B2
(45) Date of Patent: Oct. 3, 2023

(54) IMAGE FORMING APPARATUS THAT FORMS IMAGE ACCORDING TO INSTRUCTION FROM REMOTE LOCATION

(71) Applicant: KYOCERA Document Solutions Inc., Osaka (JP)

(72) Inventor: Kohei Okabe, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/689,678

(22) Filed: Mar. 8, 2022

(65) Prior Publication Data

US 2022/0291879 A1 Sep. 15, 2022

(30) Foreign Application Priority Data

Mar. 11, 2021 (JP) .................................. 2021-039581

(51) Int. Cl.
*G06F 3/12* (2006.01)

(52) U.S. Cl.
CPC .......... *G06F 3/1208* (2013.01); *G06F 3/1204* (2013.01); *G06F 3/1238* (2013.01); *G06F 3/1285* (2013.01)

(58) Field of Classification Search
CPC combination set(s) only.
See application file for complete search history.

(56) References Cited

U.S. PATENT DOCUMENTS

| 2007/0291286 A1* | 12/2007 | Utsunomiya | ...... H04N 1/00015 358/1.8 |
| 2009/0059286 A1* | 3/2009 | Yamaguchi | .......... H04N 1/2338 358/1.15 |
| 2012/0182376 A1* | 7/2012 | Saito | .................... B23K 26/032 347/248 |
| 2013/0141750 A1 | 6/2013 | Suzuki | |
| 2013/0155449 A1* | 6/2013 | Fernandes | ............. G06F 3/1271 358/1.15 |
| 2019/0377529 A1* | 12/2019 | Ohkawa | ................ G06F 3/1263 |
| 2021/0279012 A1* | 9/2021 | Yano | ..................... G06F 3/1208 |
| 2021/0326806 A1* | 10/2021 | Perez | ...................... G06F 16/29 |
| 2021/0398262 A1* | 12/2021 | Iwano | ................ H04N 1/00005 |
| 2022/0245411 A1* | 8/2022 | Ikebata | .................. G06F 3/1208 |

FOREIGN PATENT DOCUMENTS

JP 2013-114246 A 6/2013

* cited by examiner

*Primary Examiner* — Helen Zong
(74) *Attorney, Agent, or Firm* — IP BUSINESS SOLUTIONS, LLC

(57) ABSTRACT

An image forming apparatus includes an enquirer that temporarily suspends production of a printed material, after at least one set of the printed materials has been produced, upon deciding that a print request has been sent from a predetermined remote location distant from an installation site of the image forming apparatus, and enquires whether the production of the printed material may be resumed, to a user through a network I/F, a response receiver that receives a response from the user, to the enquiry made by the enquirer, and a controller that resumes the production of the printed material, upon deciding that the response receiver has received a permission to resume the production of the printed material, from the user.

4 Claims, 14 Drawing Sheets

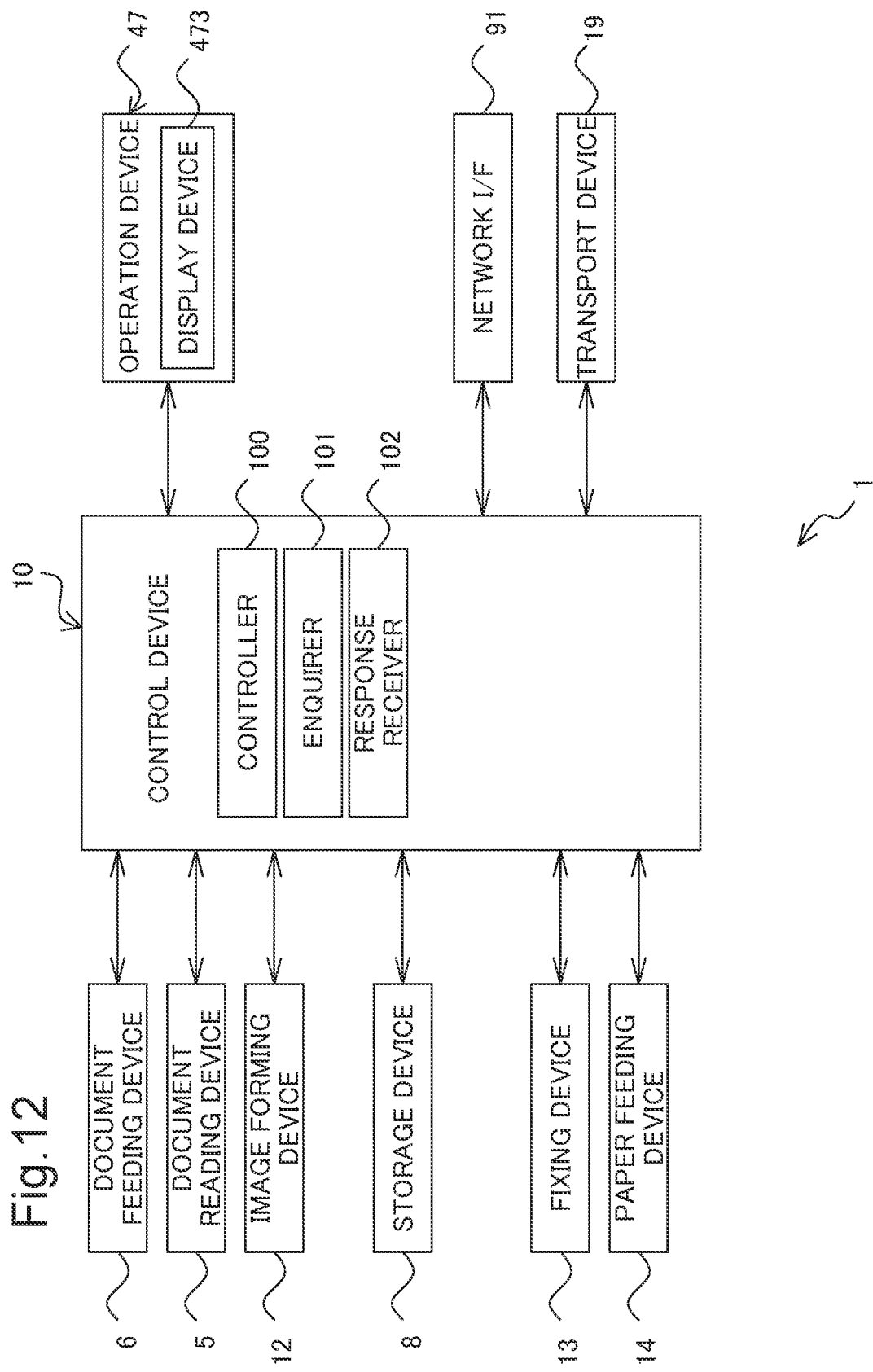

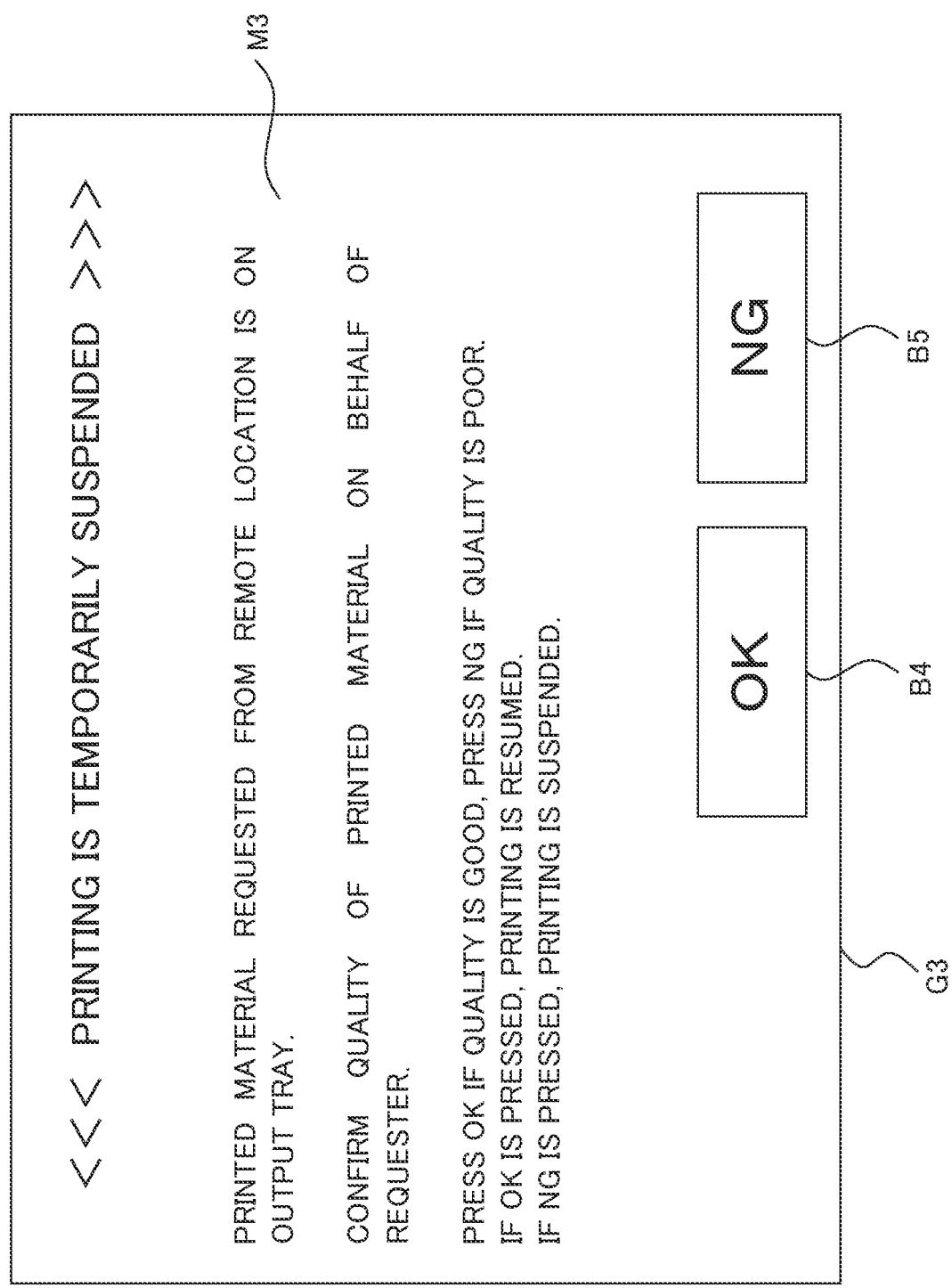

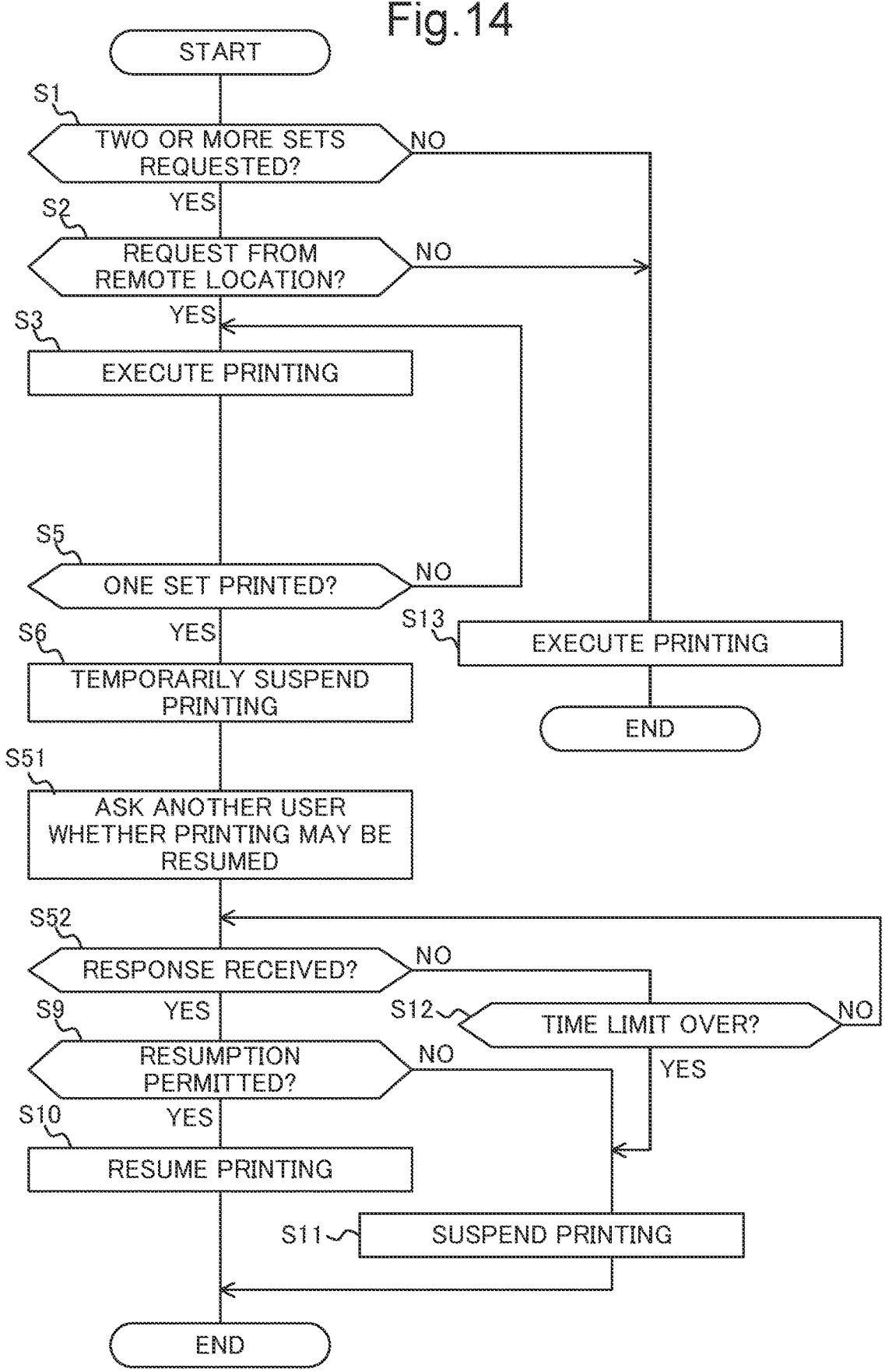

IMAGE FORMING APPARATUS THAT FORMS IMAGE ACCORDING TO INSTRUCTION FROM REMOTE LOCATION

INCORPORATION BY REFERENCE

This application claims priority to Japanese Patent Application No. 2021-039581 filed on Mar. 11, 2021, the entire contents of which are incorporated by reference herein.

BACKGROUND

The present disclosure relates to an image forming apparatus to be operated from a remote location.

Recently, a work style called "remote work", in which the worker uses the home as workplace instead of the office of the company, has come to gather attention, and is actually prevailing. The user doing the remote work may request, for example, an image forming apparatus, such as a printer, installed in the office in the remote location to perform a printing job, using the remote work environment.

For example, the user may wish to send a print request from the home to the image forming apparatus installed in the office, to produce a printed material to be used as handout for a meeting to be held in the office the next day, thereby preparing the printed material for the meeting in advance. In this case, the user can distribute the handout to the participants of the meeting, immediately after arriving at the office the next day.

However, in the case where the image forming apparatus installed in the remote location has executed the printing job, it is difficult for the user to confirm the quality of the printed material.

When the quality of the printed material meets the requirement of the user, the printed material can be utilized as it is. However, in case the quality deviates from the level permissible to the user, the printing job has to be again executed, which provokes a great deal of extra work, and produces waste of the printed material. Moreover, when the time is running short, the problem becomes more serious, such that the hand out is unable to be prepared in time for the meeting. Presumable reasons of the inferior quality of the printed material include, for example, a human error by the user, such as a wrong setting of the printing condition.

Examples of the human error include the case where the user has selected the sheet of A3 size, when actually the sheet of A4 size should have been used, and the case where, although the user has correctly selected the sheet of A4 size, the A4 sheets had run out, and therefore the sheet of A5 size was used instead.

Accordingly, a sheet processing apparatus has been proposed, configured to scan a printed material that has been outputted, and inspect the printed material through comparison between image data acquired by the scanning, and reference data representing the original data for comparison.

SUMMARY

The disclosure proposes further improvement of the foregoing techniques.

In an aspect, the disclosure provides an image forming apparatus including a transport device, an image forming device, a communication device, and a control device. The transport device transports a recording sheet. The image forming device forms an image on the recording sheet, thereby producing a printed material. The communication device enables data communication with a terminal device. The control device includes a processor, and acts as a controller, an enquirer, and a response receiver, when the processor executes a control program. The controller causes, upon receipt of a print request transmitted from the terminal device, through the communication device, the image forming device to produce the printed material, and to deliver the produced printed material to outside, by controlling the transport device and the image forming device according to the print request received. The enquirer temporarily suspends the production of the printed material, after at least one set of the printed materials has been produced, upon deciding that the print request has been sent from a predetermined remote location distant from an installation site of the image forming apparatus, and enquires whether the production of the printed material may be resumed, to a user. The response receiver receives a response from the user, to the enquiry made by the enquirer. The controller resumes the production of the printed material, upon deciding that the response receiver has received a response that the production of the printed material may be resumed, from the user.

BRIEF DESCRIPTION OF THE DRAWINGS

FIG. 12 is a functional block diagram schematically showing an essential internal configuration of an image forming apparatus according to a fourth embodiment;

FIG. 13 is a schematic drawing showing an example of operation screens displayed on the display device; and FIG. 14 is a flowchart showing an example of operations performed by the image forming apparatus according to the fourth embodiment.

DETAILED DESCRIPTION

Figure 1:
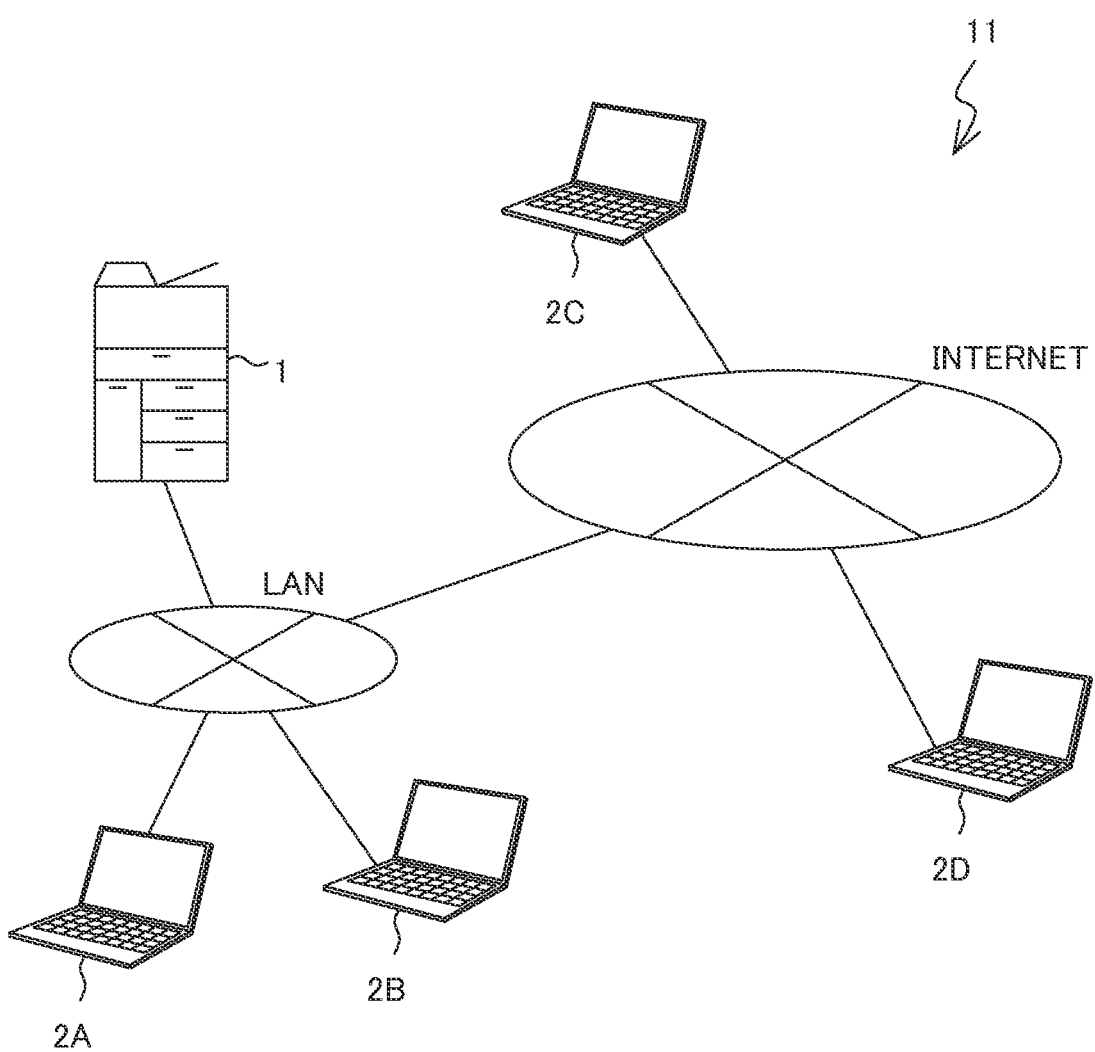
FIG. 1 is a schematic diagram showing a general configuration of an image forming system including an image forming apparatus according to a first embodiment of the disclosure.

Hereafter, an image forming apparatus according to some embodiments of the disclosure will be described, with reference to the drawings. FIG. 1 is a schematic diagram showing a general configuration of an image forming system including the image forming apparatus according to a first embodiment of the disclosure.

The image forming system 11 includes an image forming apparatus 1 and terminal devices 2A and 2B, installed in an office of a company, and terminal devices 2C and 2D used in a location other than the office, for example a user's home, the image forming apparatus 1, the terminal devices 2A and 2B, and the terminal devices 2C and 2D being connected to each other via a network such as the internet. The image forming apparatus 1 and the terminal device 2A and 2B are connected via an in-house network.

The image forming apparatus 1 is a multifunction peripheral having a plurality of functions, such as copying, printing, scanning, and facsimile transmission. The terminal devices 2A, 2B, 2C, and 2D (hereinafter, "terminal device 2" where appropriate) are personal computers for example, and configured to request the image forming apparatus 1 to perform a printing job.

Figure 2:
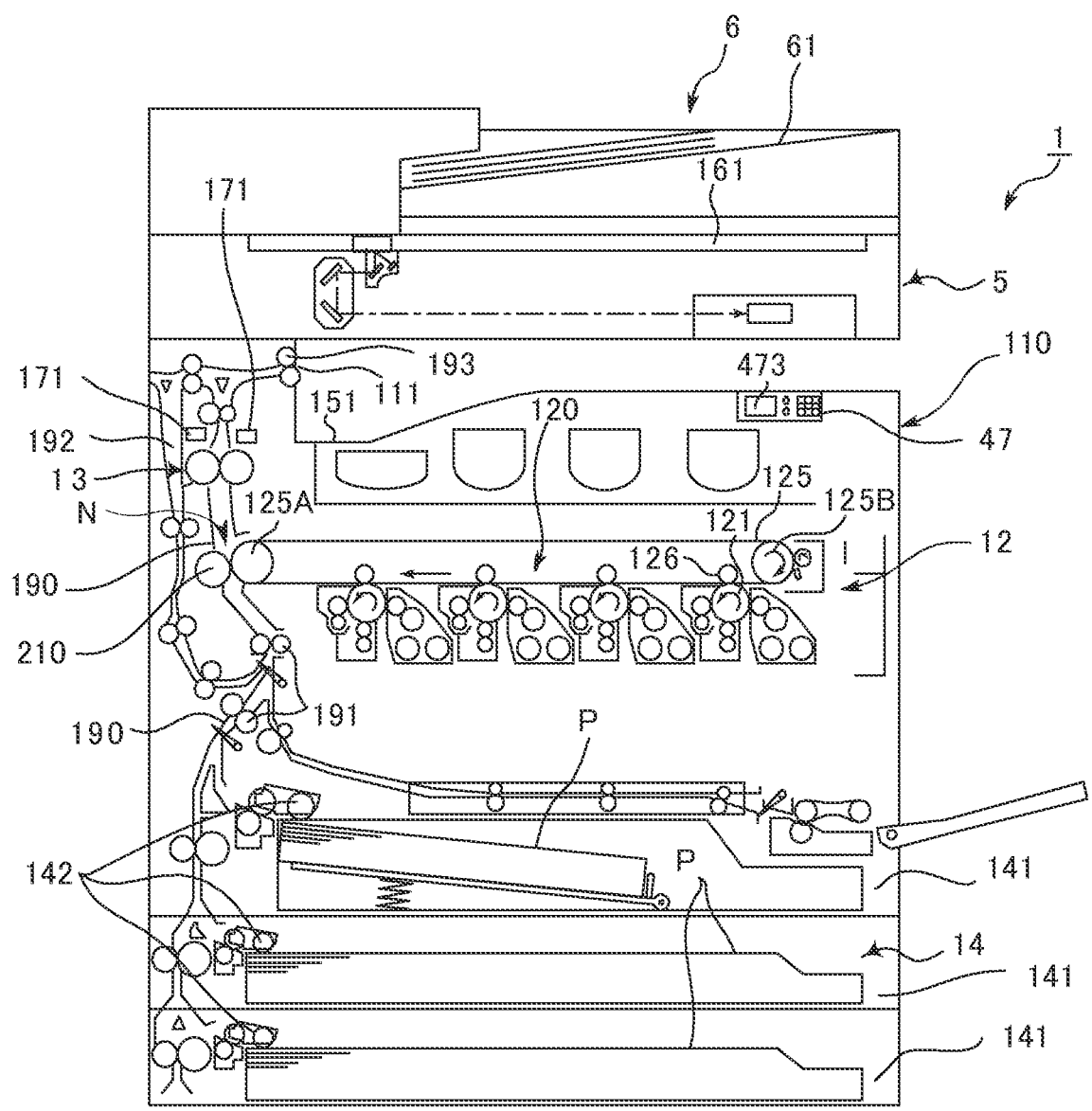
FIG. 2 is a partially cross-sectional front view, schematically showing a structure of the image forming apparatus according to the first embodiment.

FIG. 2 is a partially cross-sectional front view, schematically showing a structure of the image forming apparatus according to the first embodiment. The image forming apparatus 1 includes an operation device 47, a document feeding device 6, a document reading device 5, an image forming device 12, a fixing device 13, and a paper feeding device 14, which are provided inside an apparatus main body 110.

The operation device 47 receives instructions from the user to execute the functions and operations that the image forming apparatus 1 is configured to perform, such as an image forming operation. The operation device 47 includes a display unit 473 for displaying, for example, an operation guide for the user. The operation device 47 also receives, through a touch panel provided on the display device 473, an input of a user's instruction based on an operation performed by the user on the operation screen of the display device 473 (touch operation).

The display device 473 includes, for example, a liquid crystal display (LCD). The display device 473 includes the touch panel. When the user touches a button or a key displayed on the screen, the touch panel receives the instruction corresponding to the touched position.

The document feeding device 6 is openably connected to the upper face of the document reading device 5, via a non-illustrated hinge. The document feeding device 6 serves as a document retention cover, when the document reading device 5 reads a source document placed on a platen glass 161. The document feeding device 6 is an automatic document feeder (ADF) including a document tray 61 on which the source document is to be placed, and delivers the source documents placed on the document tray 61 to the document reading device 5.

To perform a document reading operation, the image forming apparatus 1 operates as follows. The document reading device 5 optically reads the image on a source document delivered from the document feeding device 6 to the document reading device 5, or placed on the platen glass 161, and generates image data. The image data generated by the document reading device 5 is stored, for example, in a non-illustrated image memory.

The document reading device 5 includes a light source, a reflection mirror, and so forth, and is configured to read the image of the source document, by emitting light from the light source to the source document and receiving the reflected light with a charge-coupled device (CCD) sensor, and generate image data, under the control of a control device 10 (see FIG. 3) to be subsequently described.

To perform the image forming operation, the image forming apparatus 1 operates as follows. The image forming device 12 forms a toner image on a recording sheet P serving as a recording medium, delivered from the paper feeding device 14 and transported along a transport route 190, on the basis of the image data generated through the document reading operation, the image data stored in the image memory, or image data received from a computer connected via a network.

The image forming device 12 includes a photoconductor drum 121 for each of black, yellow, cyan, and magenta, the photoconductor drum 121 being set to rotate counterclockwise in FIG. 2. The transfer device 120 includes an intermediate transfer belt 125, to the outer circumferential surface of which the toner image is transferred, a drive roller 125A, a follower roller 125B, and a primary transfer roller 126.

The intermediate transfer belt 125 is spanned between the drive roller 125A and the follower roller 125B, and is driven by the drive roller 125A so as to endlessly run in contact with the surface of the photoconductor drum 121, and in synchronization therewith.

The toner images of the respective colors (black, yellow, cyan, and magenta) are superposed on each other at an adjusted timing, when transferred onto the intermediate transfer belt 125, so as to form a colored toner image.

A secondary transfer roller 210 transfers the colored toner image formed on the surface of the intermediate transfer belt 125, onto the recording sheet P transported along the transport route 190 from the paper feeding device 14, at a nip region N (image forming position) of a drive roller 125A engaged with the intermediate transfer belt 125.

Then the printed material is heated and pressed by the fixing device 13, so that the toner image on the printed material is fixed by thermal compression. Further, the printed material is delivered to outside of the image forming apparatus 1, by a delivery roller pair 193 through a delivery port 111. In other words, the printed material having the image formed thereon is delivered and placed on an output tray 151.

The paper feeding device 14 includes a plurality of paper cassettes 141. A pickup roller 142 is provided on the upper side of each of the paper cassettes 141. The recording sheet P stored in the paper cassette 141 is drawn out by the pickup roller 142 toward the transport route 190, and the recording sheet P delivered to the transport route 190 is transported by a transport roller pair 191, to a nip region N.

To perform duplex printing, the image forming apparatus 1 operates as follows. The printed material, having an image formed on one side by the image forming device 12, is held between the delivery roller pair 193, after which the printed material is switched back by the delivery roller pair 193 to be delivered to a reversing route 192, thus to be transported to the upstream side in the transport direction of the recording sheet P As result, the printed material is delivered to the transport route 190, to be again transported to the nip region N. Thus, an image can also be formed on the other side of the recording sheet P.

A printed material reading sensor 171 that reads the image on the printed material, being transported along the transport route 190, is provided on each side of the transport route 190, at a position downstream of the nip region N, which is the image forming position, in the transport direction of the recording sheet P One of the printed material reading sensors 171 reads the image on the front face of the printed material, and the other printed material reading sensor 171 reads the image on the back face of the printed material. The printed material reading sensors 171 each output the image data of the printed material acquired through the reading, to the control device 10 (see FIG. 3). Here, the printed material reading sensor 171 exemplifies the printed material reading device in the disclosure, and may be, for example, a contact image scanner (CIS).

Figure 3:
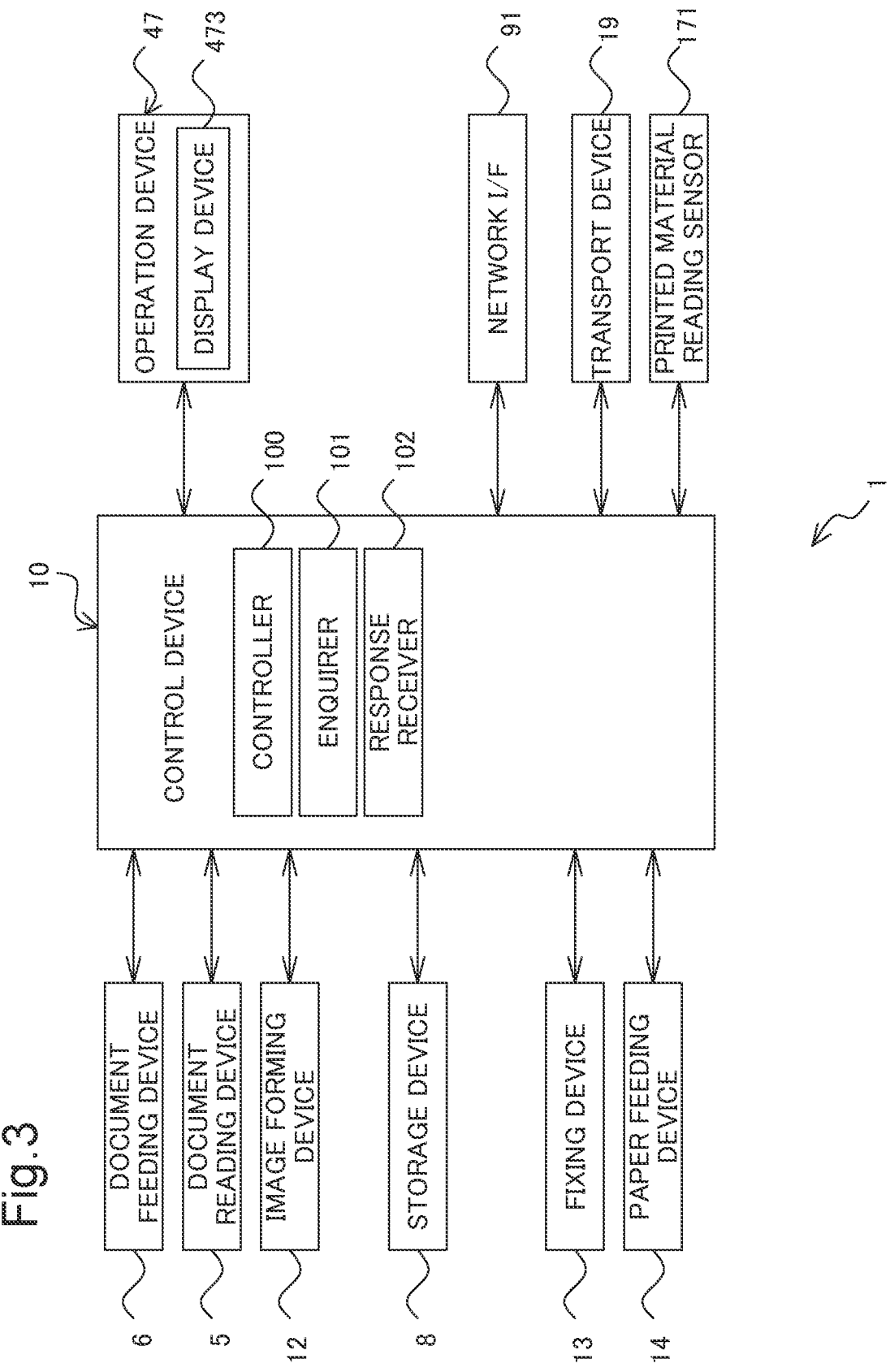
FIG. 3 is a functional block diagram schematically showing an essential internal configuration of the image forming apparatus according to the first embodiment.

FIG. 3 is a functional block diagram schematically showing an essential internal configuration of the image forming apparatus according to the first embodiment. The image forming apparatus 1 includes a control device 10, the document feeding device 6, the document reading device 5, the image forming device 12, a storage device 8, the fixing device 13, the paper feeding device 14, the operation device 47, a network interface (I/F) 91, a transport device 19, and a printed material reading sensor 171. The same components as those of the image forming apparatus 1 shown in FIG. 2 are designated by the same reference numerals, and detailed description thereof will be omitted here.

The storage device 8 is, for example, a hard disk drive (HDD) or a solid-state drive (SSD), and contains various control programs.

The transport device 19 includes the transport route 190, the transport roller pair 191, the reversing route 192, and the delivery roller pair 193.

The network I/F 91 is a communication interface that transmits and receives various types of data to and from external devices inside a local area, or on the internet (e.g., terminal device 2). The network I/F 91 exemplifies the communication device in the disclosure.

The control device 10 includes a processor, a random-access memory (RAM), a read-only memory (ROM), and an exclusive hardware circuit. The processor is, for example, a central processing unit (CPU), an application specific integrated circuit (ASIC), or a micro processing unit (MPU). The control device 10 includes a controller 100, an enquirer 101, and a response receiver 102.

The control device 10 acts as the controller 100, the enquirer 101, and the response receiver 102, when the processor operates according to a control program stored in the storage device 8. Here, the controller 100 and the related components may each be constituted in the form of a hardware circuit, instead of being performed according to the control program. This also applies to other embodiments, unless otherwise specifically noted.

The controller 100 serves to control the overall operation of the image forming apparatus 1. The controller 100 is connected to the document feeding device 6, the document reading device 5, the image forming device 12, the storage device 8, the fixing device 13, the paper feeding device 14, the operation device 47, the network I/F 91, the transport device 19, and the printed material reading sensor 171, and controls the operation of the mentioned components. For example, the controller 100 controls, upon receipt of a print request R (print image data inclusive) transmitted from the terminal device 2 (see FIG. 1), through the network I/F 91, the transport device 19 and the image forming device 12 so as to form the image represented by the print image data on the recording sheet, according to the print request R received, in other words cause the image forming device 12 to produce the printed material, and deliver the produced printed material to outside.

The enquirer 101 temporarily suspends the production of the printed material, after at least one set of the printed materials has been produced, upon deciding that the print request R received through the network I/F 91 has been sent from a predetermined remote location distant from the installation site L of the image forming apparatus 1, not from the proximity of the installation site L (e.g., office), and enquires whether the production of the printed material may be resumed, to the user.

Examples of the predetermined remote location include a location outside the room that is the installation site L of the image forming apparatus 1, a location outside the region of the LAN to which the image forming apparatus 1 is connected, and a location where it is possible to remotely operate the image forming apparatus 1. The enquirer 101 decides whether the print request R has been sent from such remote location, on the basis of, for example, the IP address of the terminal device that has outputted the print request R to the image forming apparatus 1.

The response receiver 102 receives the response from the user, to the enquiry from the enquirer 101.

The controller 100 further resumes the production of the printed material, upon deciding that the response receiver 102 has received the response from the user, and that the user has permitted the production of the printed material to be resumed.

Figure 4:
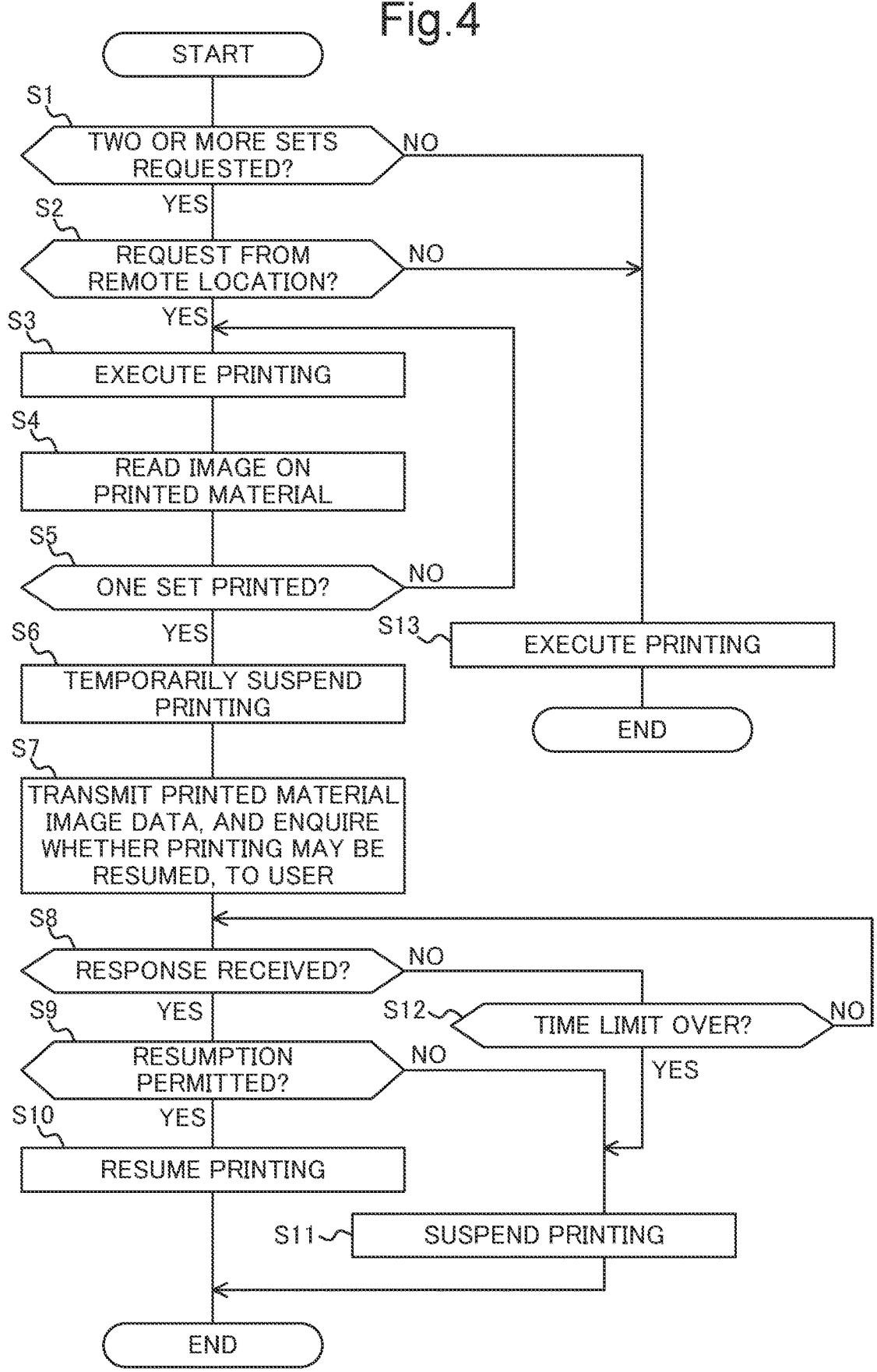
FIG. 4 is a flowchart showing an example of operations performed by the control device of the image forming apparatus according to the first embodiment.

Referring now to a flowchart shown in FIG. 4, an example of the operation performed by the image forming apparatus 1 according to the first embodiment will be described hereunder. The following operation is to be performed when the controller 100 decides that the print request R transmitted from the terminal device 2 has been received.

The enquirer 101 decides whether the print request R is requesting to print two or more sets, in other words to print only one set (S1). Upon deciding that the print request R is requesting to print two or more sets (YES at S1), the enquirer 101 decides whether the print request R has been sent from the remote location distant from the installation site L (S2).

One of the methods to make such decision is utilizing the IP address. For example, the enquirer 101 decides whether the print request R has been sent from the remote location distant from the installation site L, on the basis of the IP address assigned to the terminal device 2 that has transmitted the print request R. The IP address of the terminal device 2A or 2B connected to the in-house network is a private address, and the IP address of the terminal device 2C or 2D connected to an external network is a global address. When the IP address of the terminal device 2 that has transmitted the print request R is not a private address, the enquirer 101 decides that the print request R has been sent from the remote location distant from the installation site L.

Alternatively, one of the two following methods may be adopted, to decide whether the print request R has been sent from the remote location distant from the installation site L.

[Method 1]

The terminal device 2 transmitting the print request R may be configured to also transmit information indicating that "the print request is from a location other than the office", so that the enquirer 101 can decide that the print request R has been sent from the remote location distant from the installation site L, on the basis of such information.

For example, a check function may be given to the print driver installed in the terminal device 2, for the user to select whether to attach the information indicating that the print request is from a location other than the office. When the user selects to attach such information to the print request R through the check function, the terminal device 2 transmits the print request R to the image forming apparatus 1, with the information attached thereto.

[Method 2]

The terminal device 2 transmitting the print request R may be configured to also transmit position information, indicating the installation site of the terminal device 2. In this case, the enquirer 101 calculates the distance between the image forming apparatus 1 and the terminal device 2, on the basis of the preregistered position information of the image forming apparatus 1, and the received position information of the terminal device 2, and decides whether the print request R has been sent from the remote location distant from the installation site L, on the basis of the distance calculated as above.

When the enquirer 101 decides at S2 that the print request R has been sent from the remote location distant from the installation site L (YES at S2), the controller 100 controls the operation of the transport device 19 and the image forming device 12 according to the print request R, so as to cause the image forming device 12 to produce the printed material (S3), and also causes the printed material reading sensors 171 to read the image on the printed material (S4).

The enquirer 101 decides whether one set of the printed materials has been produced (S5), and in the case where the enquirer 101 decides that one set of the printed materials has not been produced (NO at S5), the operation returns to S3.

In contrast, upon deciding that one set of the printed materials has been produced (YES at S5), the enquirer 101 controls the operation of the transport device 19 and the image forming device 12 so as to temporarily suspend the production of the printed material (S6), and transmits, through the network I/F 91, the printed material image data, representing the image of the printed material acquired through the reading operation by the printed material reading sensors 171, to the terminal device 2 that has transmitted the print request R. At the same time, the enquirer 101 enquires whether the production of the printed material may be resumed, to the user of the terminal device 2 (S7). In this case, the enquirer 101 transmits the information necessary for the mentioned enquiry, to the terminal device 2 through the network I/F 91.

Upon receipt of such information, the terminal device 2 presents the enquiry to the user on the basis of the received information, for example using a dialogue box, and stands by for an input of the response from the user ("OK" or "NG"). When the user inputs the response, the terminal device 2 transmits the information indicating the user's response to the image forming apparatus 1.

Further, since the printed material image data is transmitted to the terminal device 2, the terminal device 2 can display the image represented by the printed material image data (i.e., the image of the printed material). Therefore, the user can evaluate the quality level of the printed material, by visually confirming the image on the printed material.

The controller 100 decides whether the response receiver 102 has received the response from the terminal device 2 (S8). Upon deciding that the response receiver 102 has received the response from the terminal device 2 (YES at S8), the controller 100 then decides whether the response represents the user's permission to resume the production of the printed material (S9).

Upon deciding that the response represents the user's permission to resume the production of the printed material (YES at S9), the controller 100 controls the operation of the transport device 19 and the image forming device 12 so as to resume the production of the printed material, and to deliver the printed material (S10). Thereafter, the operation is finished.

In contrast, in the case of deciding that the response does not represent the user's permission to resume the production of the printed material (NO at S9), the controller 100 suspends the production of the printed material at this point (S11). Thereafter, the operation is finished.

In the case of deciding that the response receiver 102 has not yet received the response from the terminal device 2 (NO at S8), the controller 100 decides whether an elapsed time T, corresponding to the time that has elapsed after the enquirer 101 made the foregoing enquiry, is equal to or longer than a predetermined threshold TH (e.g., 5 minutes) (S12).

Upon deciding that the elapsed time T is equal to or longer than the threshold TH (YES at S12), the controller 100 decides that the time limit is over, and suspends the production of the printed material (S11). Thereafter, the operation is finished. In contrast, in the case where the controller 100 decides that the elapsed time T is shorter than the threshold TH (NO at S12), the operation returns to S8.

Alternatively, when the controller 100 decides that the time limit is over, the controller 100 may resume the production of the printed material, instead of suspending the production thereof, because the instruction to suspend the production has not been received from the user. Further, the operation device 47 may be configured to accept the user's setting in advance, regarding the procedure to be followed when the time limit is over, so that the controller 100 executes the procedure set by the user.

When the enquirer 101 decides that the number of sets requested by the print request R is not two or more (i.e., only one set is requested) (NO at S1), and that the print request R has not been sent from the remote location distant from the installation site L (i.e., print request R is from the office) (NO at S2), the controller 100 controls, as usual, the operation of the transport device 19 and the image forming device 12 according to the print request R, so as to cause the image forming device 12 to produce the printed material and to deliver the same (S13). Thereafter, the operation is finished.

According to the first embodiment, when the print request R is sent from the remote location, the production of the printed material is temporarily suspended, and the enquiry is made to the user of the terminal device 2 about whether the production of the printed material may be resumed. If the user permits, the production of the printed material is resumed, but not in the negative case. Thus, the user can utilize the period during which the production of the printed material is temporarily suspended, as the opportunity to confirm the quality of the printed material.

Under such a rule that the user permits the production of the printed material to be resumed, upon deciding that the quality of the printed material is at a satisfactory level, but does not permit the resumption of the production upon deciding that the quality is deviated from a permissible range, the printed material of the quality deviating from the permissible range (printed material to be wasted) is no longer produced, and only the printed materials of the satisfactory quality level are produced. Factors for quality evaluation by the user include, for example, sheet size, color or B/W, scaling, allocation, and density.

For example, although the sheet processing apparatus referred to as Background Art is capable of inspecting the printed material, such sheet processing apparatus is unable to detect a human error by the user, such as a wrong setting of the printing condition. This is because the reference data, serving as the original data for comparison, is intrinsically unavailable with respect to the human error. With the arrangement according to the first embodiment, in contrast, the printed material of the satisfactory quality level can be produced, on the basis of the print request made from the remote location, with minimized waste of the printed material.

The production of the printed material is temporarily suspended, at the time that one set of the printed materials has been produced, according to the first embodiment. This is because, for example, in the case where the printing is suspended after one sheet has been printed, when there are 10 sheets of images to be printed, the user can only confirm the quality of that one sheet, and is unable to confirm the quality of the remaining 9 sheets. However, the production of the printed material may be temporarily suspended at the time that one sheet of the printed material has been produced, despite one set of the printed materials not having been produced. In this case also, such factors as color or B/W, consolidation, print density, and appearance of font can be evaluated, by only confirming the quality of the first sheet of the printed material, out of a plurality of sheets of images to be printed. Therefore, the number of sheets to be wasted because of the failure in printing can still be reduced.

Alternatively, however, the terminal device 2 may be configured to accept the user's designation of a page that the user wishes to confirm, and transmit the page information designated by the user to the image forming apparatus 1, so that the controller 100 may print one sheet of the page designated by the user, on the basis of the page information received. For example, the enquirer 101 may transmit, at the time of making the aforementioned enquiry, the printed material image data representing the images of the printed material, including a plurality of pages acquired through the reading operation by the printed material reading sensors 171, together with page order information indicating the order of pages, to the terminal device 2 through the network I/F 91, and the controller 100 may cause the image forming device 12 to print only the page indicated by the page information, when the response receiver 102 receives the page information designating the page, together with the response representing the permission to resume the production of the printed material, from the user.

Here, in the case where the enquirer 101 decides whether the print request R has been sent from the remote location distant from the installation site L, by receiving, according to the Method 1, the information indicating that "the print request is from outside the office" transmitted from the terminal device 2 to the image forming apparatus 1, the following advantageous effects can be attained.

For example, when the print request is to be made from the terminal device 2C or 2D located at the remote location distant from the installation site L, the terminal device 2 may selectively transmit the information that "the print request is from outside the office" or that "the print request from the office" to the image forming apparatus 1, according to the Method 1. In this case, the temporary suspension function can be made invalid in the image forming apparatus 1, by causing the terminal device 2 to transmit the information that "the print request is from the office", to the image forming apparatus 1. With such an arrangement, two or more sets can be successively printed, without temporary suspension as usual, when the user requests the printing of two or more sets from the remote location distant from the installation site L, which leads to improved convenience in printing operation.

Although the printed material reading sensors 171 are provided on the respective sides along the transport route 190, in the first embodiment, the printed material reading sensor 171 may be provided on either side of the transport route 190, since the image forming apparatus 1 includes the reversing route 192, and the printed material reading sensor 171 can read the image on the back face, when the printed material is reversed.

Further, although the image forming apparatus 1 includes the printed material reading sensor 171, for the single purpose of reading the image on the printed material as the printed material reading device, in the first embodiment, the document reading device 5 may be configured to also act as the printed material reading device. In this case, a mechanism to transport the printed material to the document reading device 5 may be provided on the transport device 19, and the controller 100 may control the operation of the transport device 19 so as to transport the printed material to the document reading device 5, and cause the document reading device 5 to read the image on the printed material.

Figure 5:
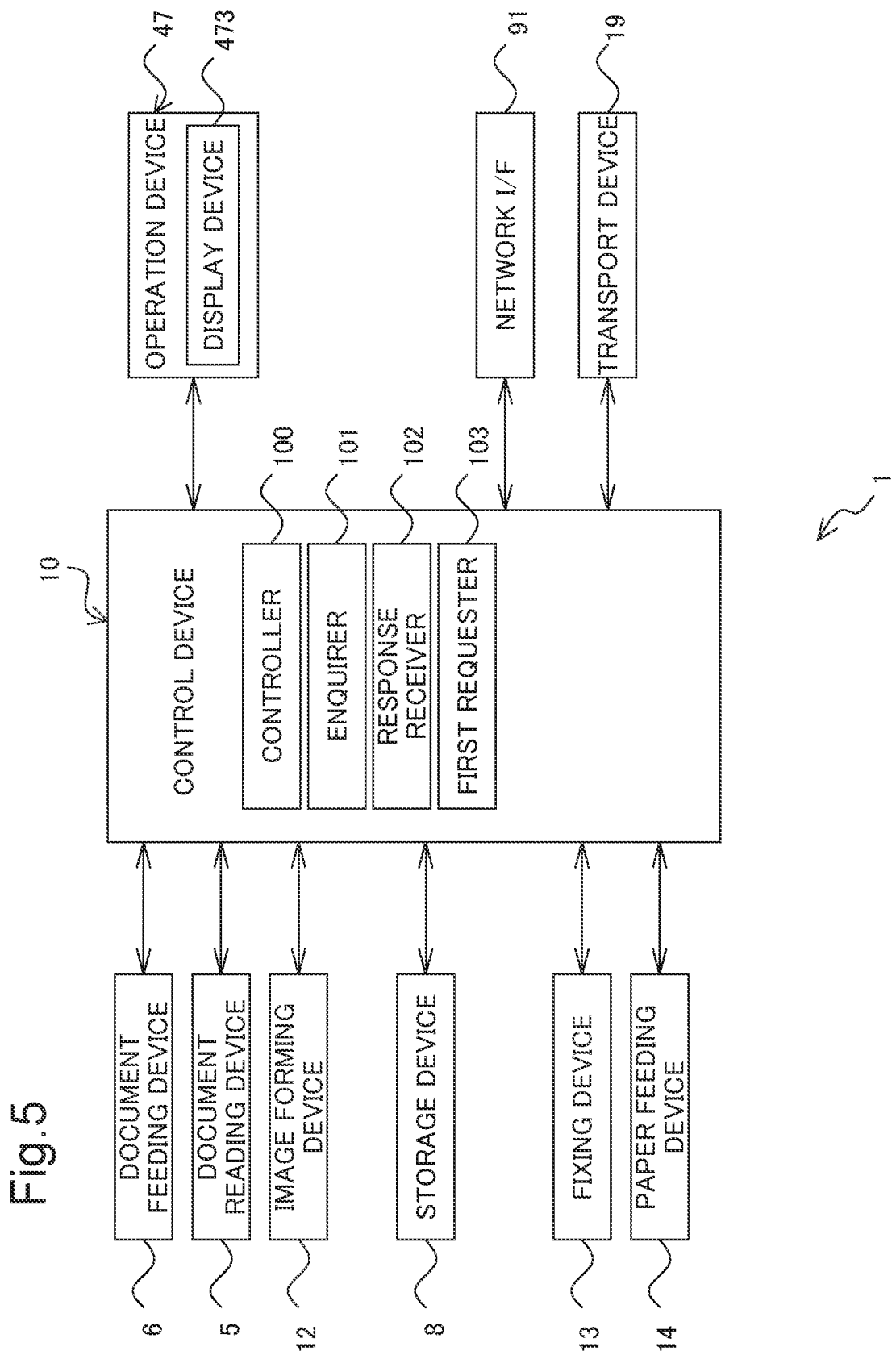
FIG. 5 is a functional block diagram schematically showing an essential internal configuration of an image forming apparatus according to a second embodiment.

FIG. 5 is a functional block diagram schematically showing an essential internal configuration of an image forming apparatus according to a second embodiment. The image forming apparatus according to the second embodiment is different from the image forming apparatus according to the first embodiment shown in FIG. 3, in that the printed material reading sensors 171 are not provided, and that the control device 10 includes a first requester 103. In the second embodiment, the control device 10 also acts as the first requester 103, when the processor operates according to the control program. The description of the elements of the second embodiment, same as or similar to those of the first embodiment, will not be repeated. In the second embodiment, the image forming apparatus 1 is without the printed material reading sensor 171.

The first requester 103 causes the display device 473 to display a request screen, for requesting another user, different from the user of the terminal device 2 (a person present around the image forming apparatus 1), to cause the document reading device 5 to read the image on the printed material delivered to outside, after the enquirer 101 has temporarily suspended the printing.

Figure 6:
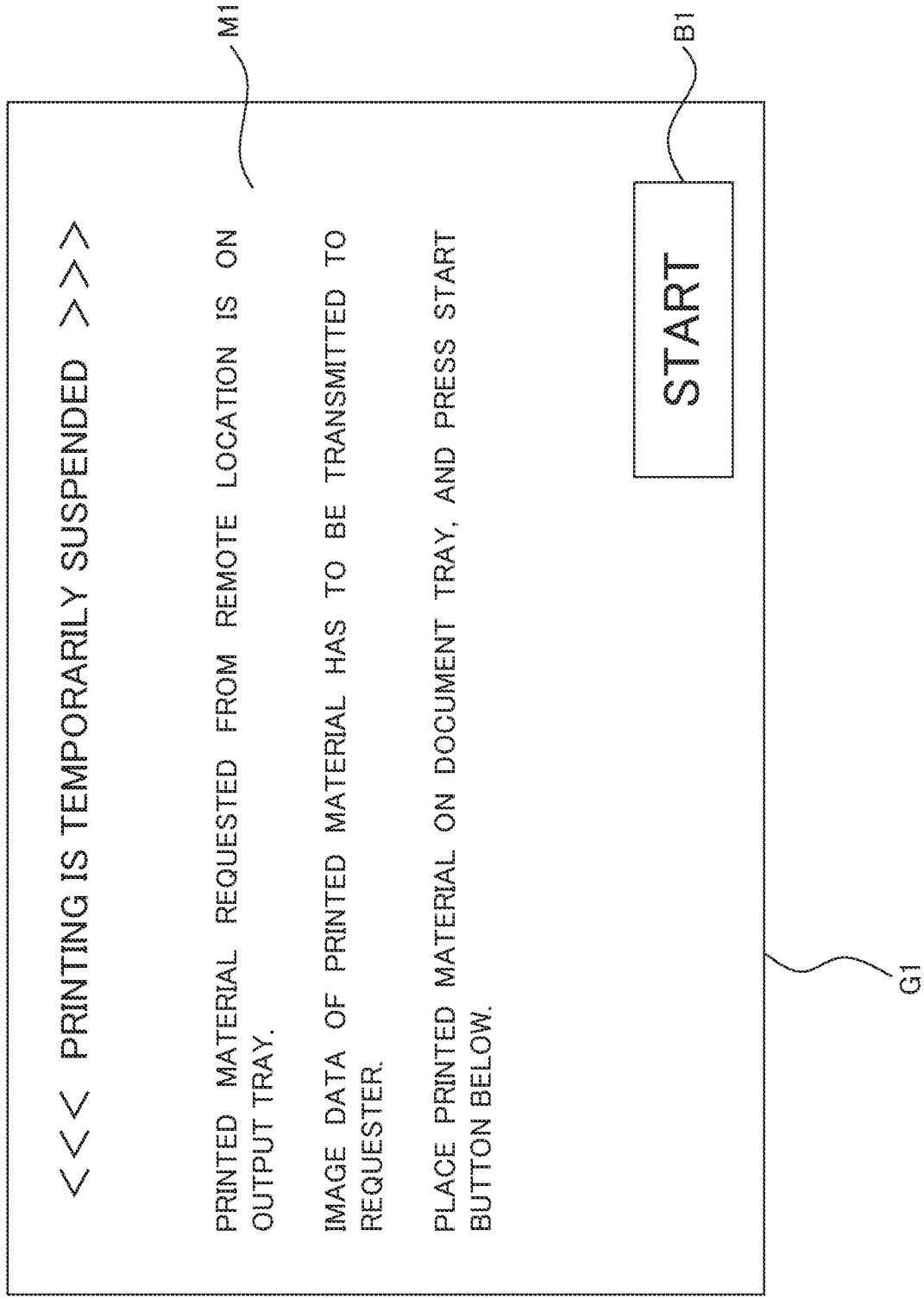
FIG. 6 is a schematic drawing showing an example of operation screens displayed on a display device.

FIG. 6 illustrates an example of the operation screen displayed on the display device 473. The operation screen G1 shown in FIG. 6 is an example of the request screen, and includes a message M1 requesting the other user to read the image on the printed material, and an operation button B1 marked as "Start".

Figure 7:
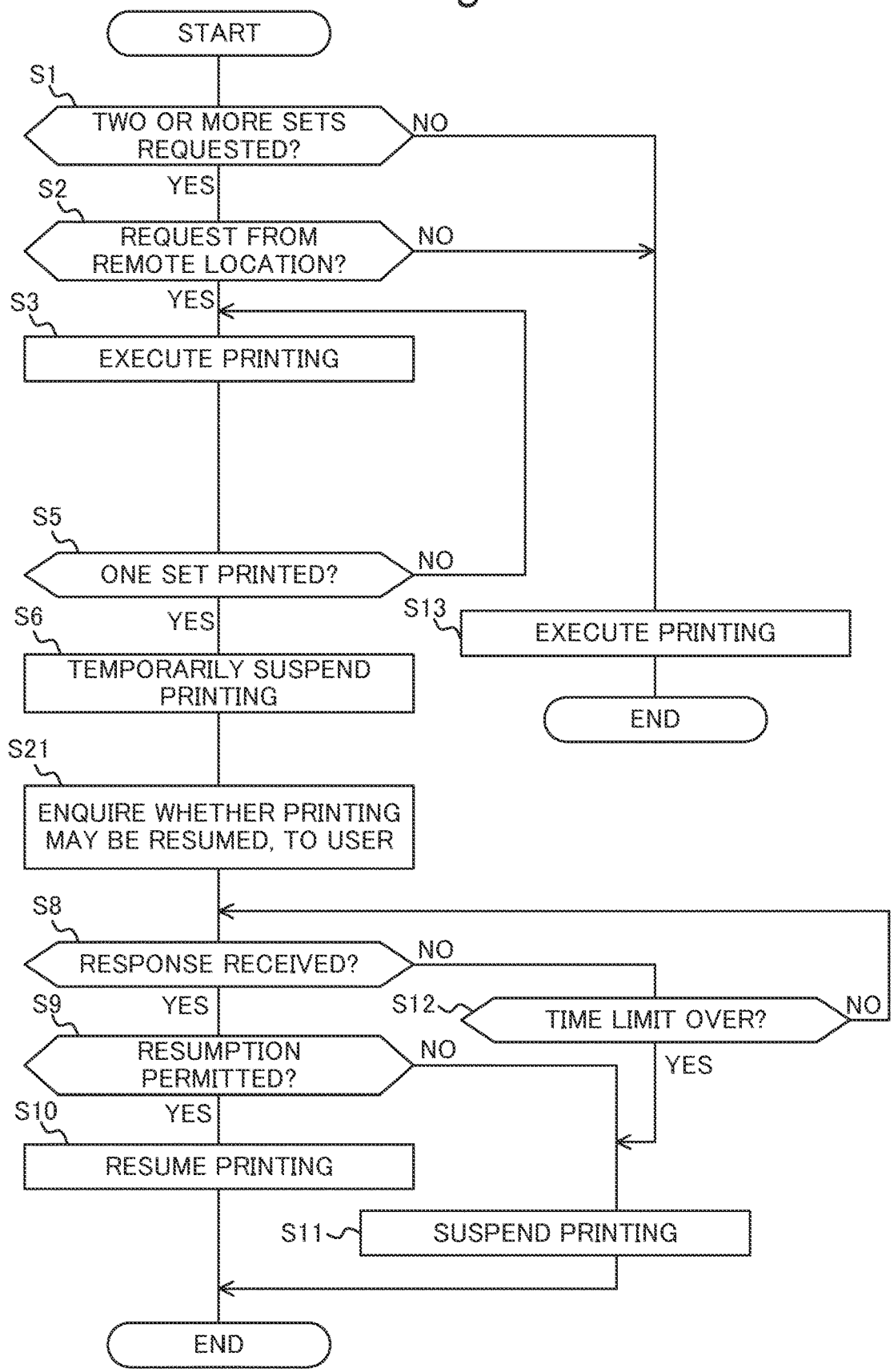
FIG. 7 is a flowchart showing an example of operations performed by the image forming apparatus according to the second embodiment.
Figure 8:
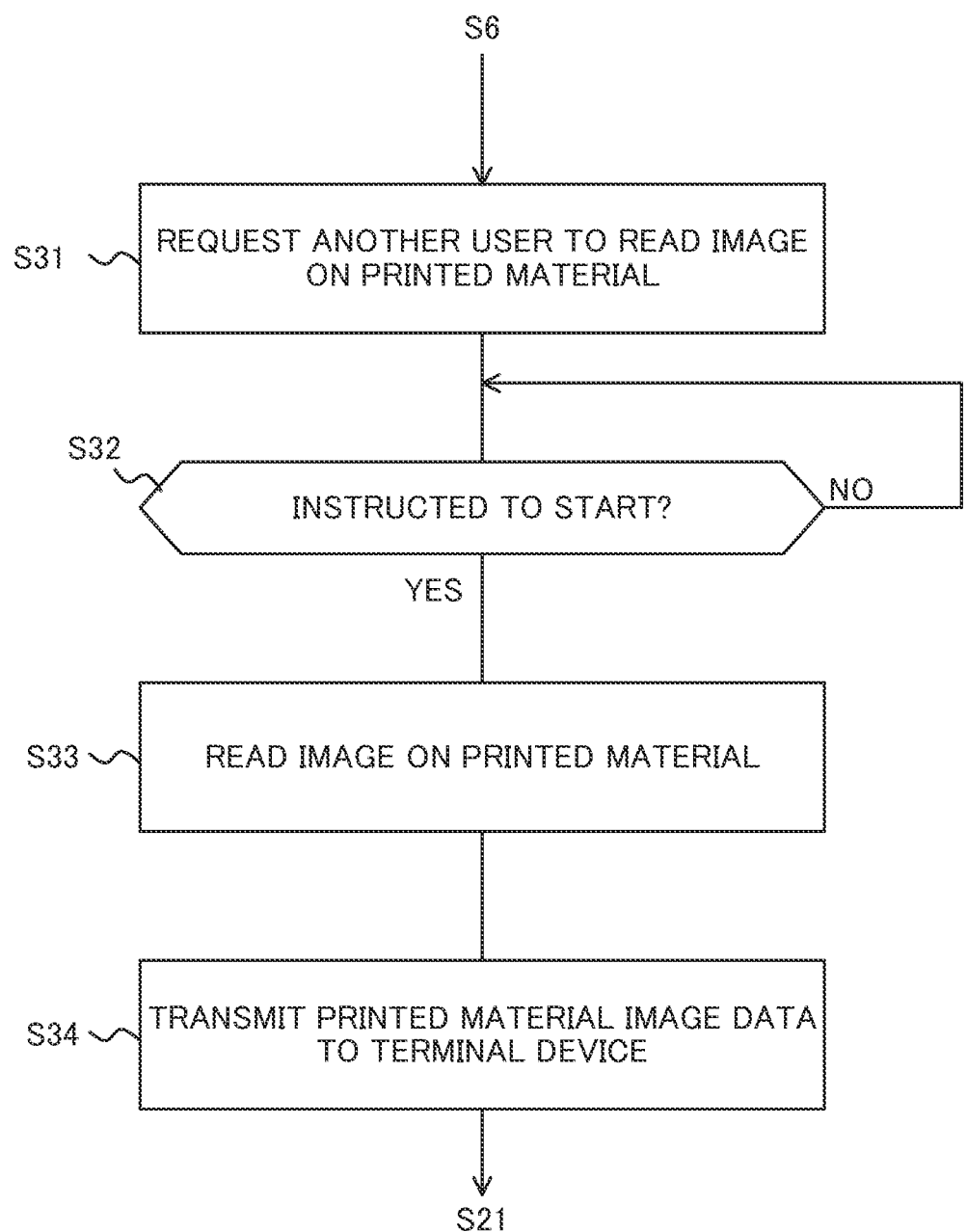
FIG. 8 is a flowchart showing an example of an additional operation performed by the image forming apparatus according to the second embodiment.

Referring now to flowcharts shown in FIG. 7 and FIG. 8, an example of the operation performed by the image forming apparatus 1 according to the second embodiment will be described hereunder. The following operation is to be performed when the controller 100 decides that the print request R transmitted from the terminal device 2 has been received. Further, the following operation is different from the flowchart shown in FIG. 4 in that S4 is excluded, and that S7 is substituted with S21, and therefore the description will be focused only on such differences. In other words, the description of the arrangements in the second embodiment same as or similar to those of the first embodiment will not be repeated.

When the enquirer 101 temporarily suspends the production of the printed material (S6), the first requester 103 causes the display device 473 to display the operation screen G1 shown in FIG. 6 (S31). As result, another user, different from the user of the terminal device 2 that has transmitted the print request R, is requested to read the image on the printed material.

The enquirer 101 decides whether the operation device 47 has received a document reading instruction, inputted by the other user through the operation button B1 marked as "Start" (S32). Here, it will be assumed that the other user has set the printed material on the document reading device 5, and inputted the document reading instruction through the operation device 47. Upon deciding that the operation device 47 has received the document reading instruction (YES at S32), the enquirer 101 controls the operation of the document feeding device 6 and the document reading device 5, to cause the document reading device 5 to read the image on the printed material placed on the document tray 61 (S33).

When all of the printed materials placed on the document tray 61 have been read, the enquirer 101 transmits the printed material image data, acquired through the reading operation by the document reading device 5, to the terminal device 2 that transmitted the print request R, through the network I/F 91 (S34). Thereafter, the operation proceeds to S21.

At S21, the enquirer 101 enquires whether the production of the printed material may be resumed, to the user of the terminal device 2 that transmitted the print request R, through the network I/F 91 (S21). Thereafter, the controller 100 performs the operation of S8 and the subsequent steps, according to the response that the response receiver 102 has received from the terminal device 2.

With the configuration according to the second embodiment, the image forming apparatus 1 can read the printed material, and transmit the printed material image data acquired through the reading to the terminal device 2, without the need to utilize the printed material reading sensor 171.

Figure 9:
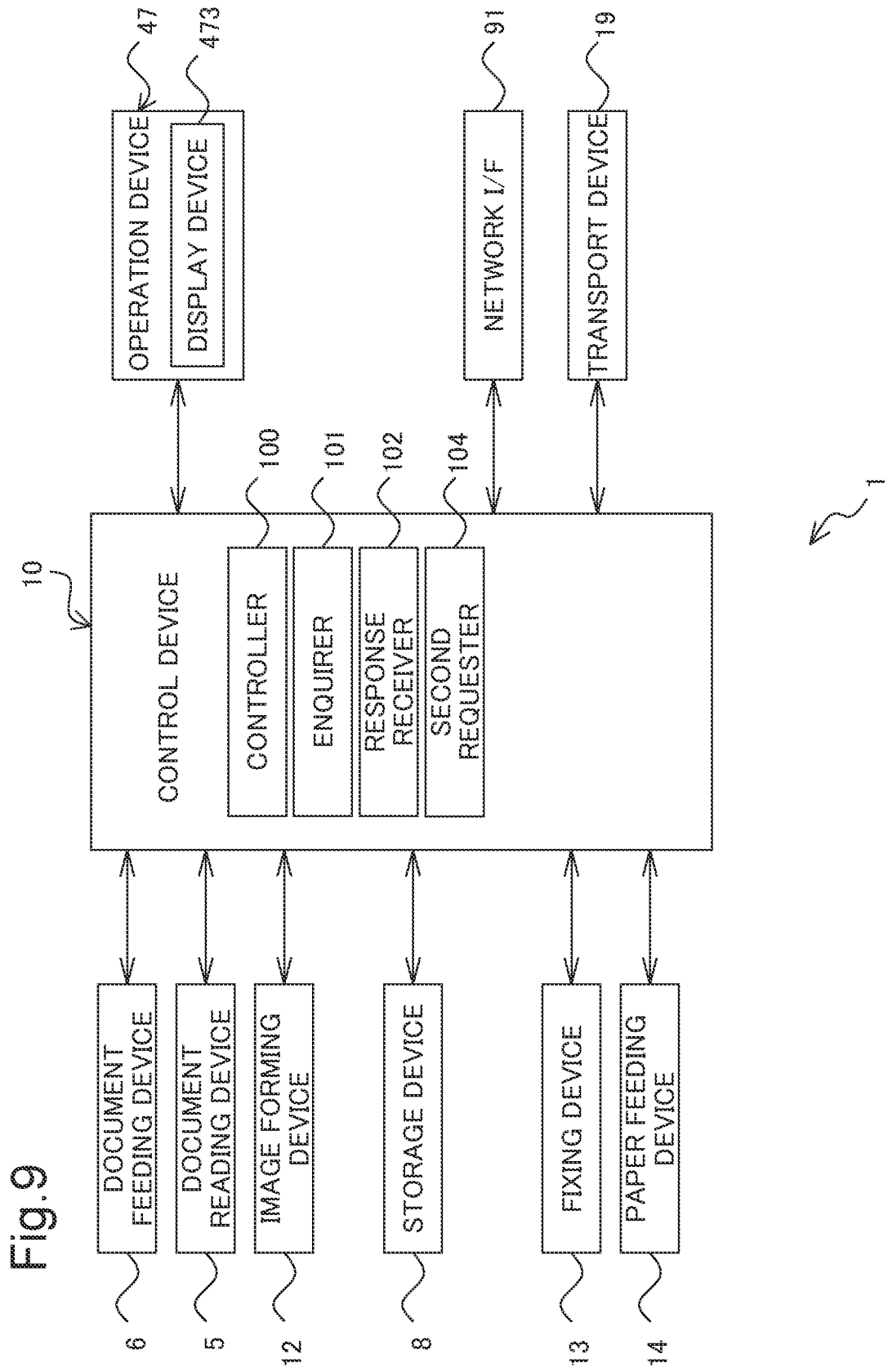
FIG. 9 is a functional block diagram schematically showing an essential internal configuration of an image forming apparatus according to a third embodiment.

Hereunder, a third embodiment of the image forming apparatus 1 will be described. FIG. 9 is a functional block diagram schematically showing an essential internal configuration of the image forming apparatus according to the third embodiment. The image forming apparatus according to the third embodiment is different from the image forming apparatus according to the second embodiment shown in FIG. 5, in that the control device 10 includes a second requester 104, in place of the first requester 103. In the third embodiment, the control device 10 also acts as the second requester 104, when the processor operates according to the control program. The description of the elements of the third embodiment, same as or similar to those of the first and second embodiments, will not be repeated. In the third embodiment, the image forming apparatus 1 is without the printed material reading sensor 171.

The second requester 104 causes the display device 473 to display a request screen, for requesting another user, different from the user of the terminal device 2, to confirm the quality level of the printed material delivered to outside, after the enquirer 101 has temporarily suspended the printing.

Figure 10:
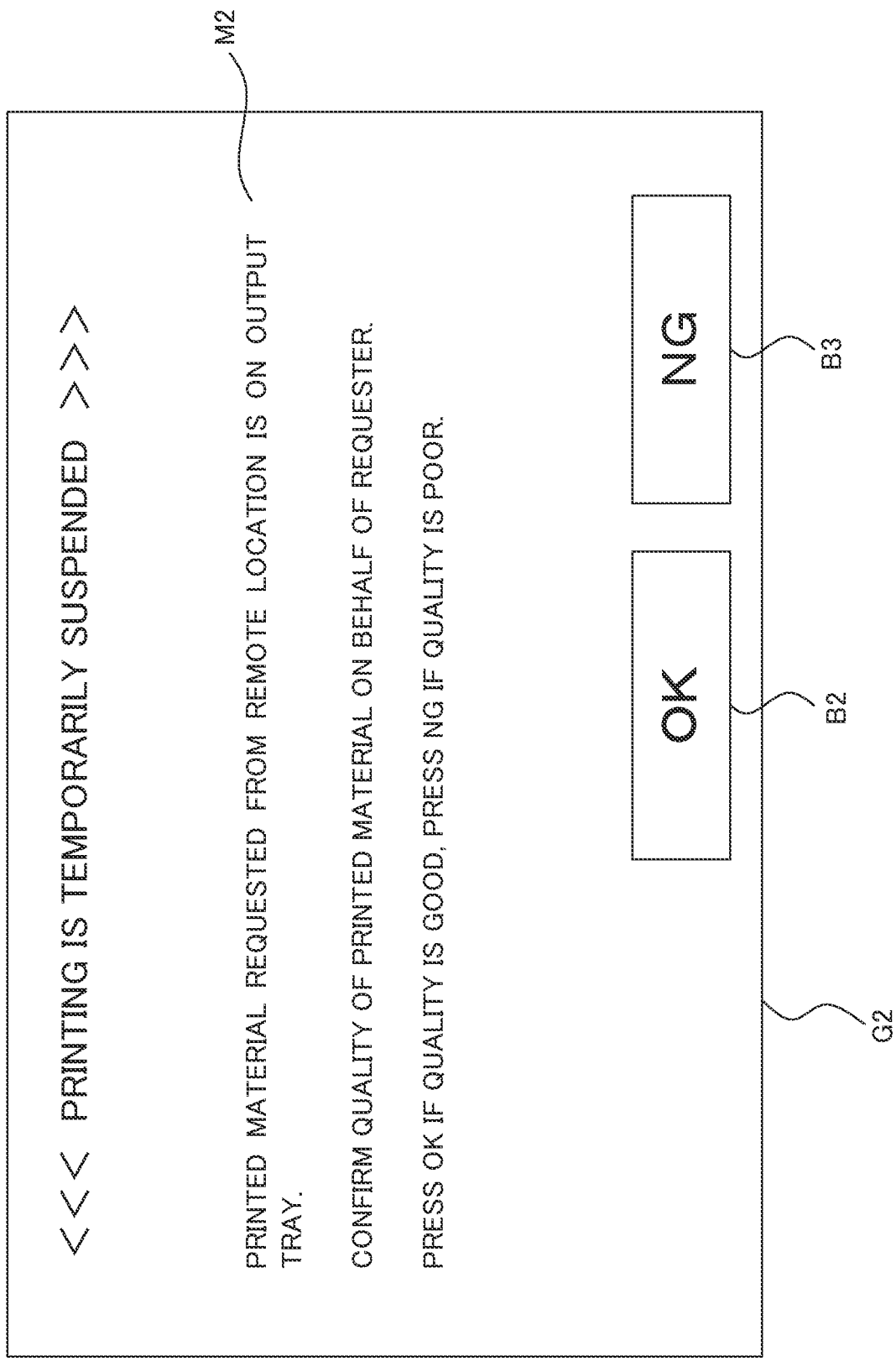
FIG. 10 is a schematic drawing showing an example of an operation screens displayed on the display device.

FIG. 10 illustrates an example of the operation screen displayed on the display device 473. The operation screen G2 shown in FIG. 10 is an example of the request screen, and includes a message M2 requesting the other user to confirm the quality level of the printed material, an operation button B2 marked as "OK", and an operation button B3 marked as "NG".

Figure 11:
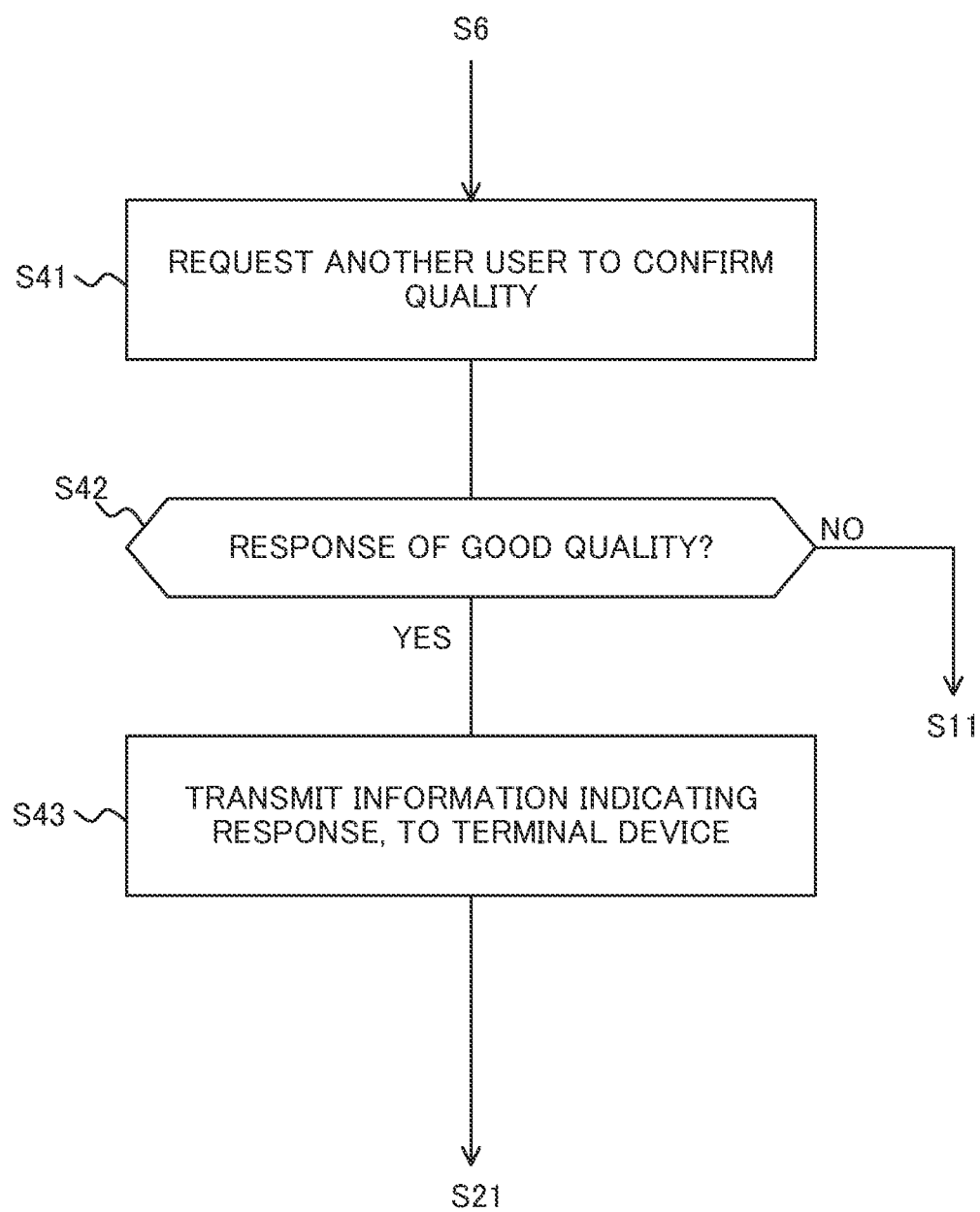
FIG. 11 is a flowchart showing an example of operations performed by the image forming apparatus according to the third embodiment.

Referring now to flowcharts shown in FIG. 7 and FIG. 11, an example of the operation performed by the image forming apparatus 1 according to the third embodiment will be described hereunder. The following operation is to be performed when the controller 100 decides that the print request R transmitted from the terminal device 2 has been received. Further, the following operation is different from the flowchart shown in FIG. 4 in that S4 is excluded, and that S7 is substituted with S21. The description of the arrangements in the third embodiment same as or similar to those of the first and second embodiments will not be repeated.

When the enquirer 101 temporarily suspends the production of the printed material (S6), the second requester 104 causes the display device 473 to display the operation screen G2 shown in FIG. 10 (S41). As result, another user, different from the user of the terminal device 2 that has transmitted the print request R, is requested to confirm the quality level of the printed material.

Then the operation device 47 decides which response has been received from the other user, a response indicating good quality based on the touch on the operation button B2 marked as "OK", or a response indicating poor quality based on the touch on the operation button B3 marked as "NG" (S42).

Upon deciding that the operation device 47 has received the response indicating the good quality (YES at S42), the second requester 104 transmits the information indicating the response of good quality, to the terminal device 2 that transmitted the print request R, through the network I/F 91 (S43). Thereafter, the operation proceeds to S21. When the operation device 47 receives the response indicating the poor quality (NO at S42), the operation proceeds to S11, and the printing is suspended.

With the arrangement according to the third embodiment, although the printed material image data is not transmitted to the terminal device 2, unlike in the second embodiment, the information indicating the response from the other user, present in the vicinity of the installation site L of the image forming apparatus 1, is transmitted (for example, the user who sent the print request can request the other user in the office, by e-mail or telephone, to confirm the quality level of the printed material). Therefore, the user can issue the response indicating whether the printing may be resumed, after obtaining the information necessary for making the decision whether the production of the printed material may be resumed (suggestion from the other user).

Hereunder, the image forming apparatus 1 according to a fourth embodiment will be described. FIG. 12 is a functional block diagram schematically showing an essential internal configuration of the image forming apparatus according to the fourth embodiment. The image forming apparatus according to the fourth embodiment is different from the image forming apparatus according to the third embodiment shown in FIG. 9, in that the control device 10 is without the second requester 104. The description of the elements of the fourth embodiment, same as or similar to those of the first embodiment, will not be repeated. In the fourth embodiment, the image forming apparatus 1 is different from the first embodiment, in not including the printed material reading sensor 171.

In the fourth embodiment, the enquirer 101 causes the display device 473 to display an enquiry screen, for asking another user, different from the user of the terminal device 2 that transmitted the print request R, whether the production of the printed material may be resumed.

FIG. 13 illustrates an example of the operation screen displayed on the display device 473. The operation screen G3 shown in FIG. 13 is an example of the enquiry screen, and includes a message M3 asking the other user whether the production of the printed material may be resumed, an operation button B4 marked as "OK", and an operation button B5 marked as "NG".

Referring now to a flowchart shown in FIG. 14, an example of the operation performed by the image forming apparatus 1 according to the fourth embodiment will be described hereunder. The following operation is to be performed when the controller 100 decides that the print request R transmitted from the terminal device 2 has been received. Further, the following operation is different from the flowchart shown in FIG. 7, in that S21 is substituted with S51, and that S8 is substituted with S52, and therefore the description will be focused only on such differences. In other words, the description of the arrangements in the fourth embodiment, same as or similar to those of the first embodiment, will not be repeated.

Upon temporarily suspending the production of the printed material, by controlling the operation of the transport device 19 and the image forming device 12 (S6), the enquirer 101 causes the display device 473 to display the operation screen G3 shown in FIG. 13 (S51). As result, the enquiry whether the production of the printed material may be resumed is presented to the other user.

Upon deciding that the response receiver 102 has received the response from the other user through the operation device 47 (YES at S52), the controller 100 performs the operation of S9 and the subsequent steps, according to the content of the response.

According to the fourth embodiment, unlike in the first to third embodiments, the other user different from the user of the terminal device 2 that transmitted the print request R, and located in the vicinity of the installation site L of the image forming apparatus 1, either resumes the production of the printed material, or suspends the printing, according to the content of the response inputted to the image forming apparatus 1. Therefore, the communication process between the image forming apparatus 1 and the terminal device 2 can be simplified.

The disclosure may be modified in various manners, without limitation to the configuration according to the foregoing embodiments. Although the image forming apparatus according to the disclosure is exemplified by the multifunction peripheral in the foregoing embodiment, the disclosure may be applied to a different type of image forming apparatus having the printer function.

The configurations and processings according to the foregoing embodiments, described with reference to FIG. 1 to FIG. 14, are merely exemplary and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
a transport device that transports a recording sheet;
an image forming device that forms an image on the recording sheet, thereby producing a printed material;
a communication device that enables data communication with a terminal device;
a printed material reading device that reads an image on the printed material; and
a control device including a processor, and configured to act, when the processor executes a control program, as:
a controller that causes, upon receipt of a print request transmitted from the terminal device, through the communication device, the image forming device to produce the printed material, and to deliver the produced printed material to outside, by controlling the transport device and the image forming device according to the print request received;
an enquirer that temporarily suspends, upon deciding that the print request has been sent from a predetermined remote location distant from an installation site of the image forming apparatus, the production of the printed material, just when a predetermined partial number of recording sheets, out of a total number of the recording sheets to be printed, has been printed, and executes an enquiry process to enquire whether the production of the printed material may be resumed, to a user, and does not perform, upon deciding that the print request has not been sent from the predetermined remote location, the suspending the production of the printed material and the enquiry process; and
a response receiver that receives, through the communication device, a response from the user, to the enquiry made by the enquirer,
wherein the controller further resumes the production of the printed material, upon deciding that the response receiver has received a response that the production of the printed material may be resumed, from the user,
wherein as the enquiry process, the enquirer causes the communication device to send the enquiry to the user of the terminal device, and transmit printed material image data representing the image on the printed material generated until the temporarily suspending, acquired through reading by the printed material reading device, to the terminal device.

2. The image forming apparatus according to claim 1, wherein, upon deciding that a print request for two or more sets has been made from the predetermined remote location, the enquirer temporarily suspends the production of the printed material, after one set of the printed material has been produced, and makes the enquiry to the user, but keeps from suspending the production, when the print request designates only one set, despite the print request having been made from the predetermined remote location.

3. The image forming apparatus according to claim 1, wherein, the printed material reading device reads an image on a first face of the printed material and an image on a second face of the printed material,
wherein as the enquiry process, the enquirer causes the communication device to send the enquiry to the user of the terminal device, and transmit printed material image data representing the image on the first face of the printed material generated until the temporarily suspending, and the image on the second face of the printed material, acquired through reading by the printed material reading device, to the terminal device.

4. The image forming apparatus according to claim 1, wherein the enquirer causes the communication device, when making the enquiry process, to transmit the printed material image data representing the images on a plurality of pages of the printed material, acquired through the reading by the printed material reading device, to the terminal device, together with page order information indicating an order of the pages, and
when the response receiver receives, from the user, page information designating a page, together with the response that the production of the printed material may be resumed, the controller causes the image forming device to print only the page designated by the page information.

* * * * *